July 30, 1968  R. NEUSCHOTZ ETAL  3,394,448
INSTALLATION OF LOCKING KEYS FOR THREADED PARTS
Filed Oct. 23, 1965  4 Sheets-Sheet 1
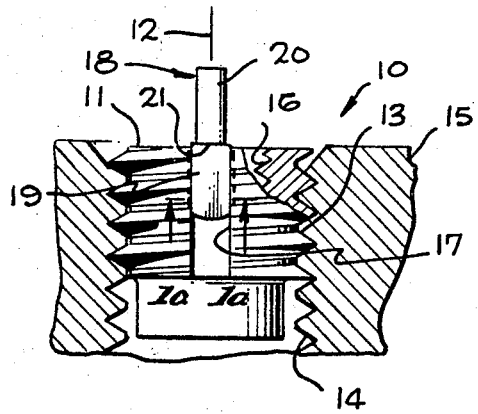
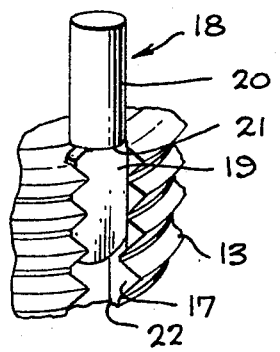
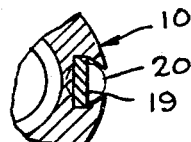
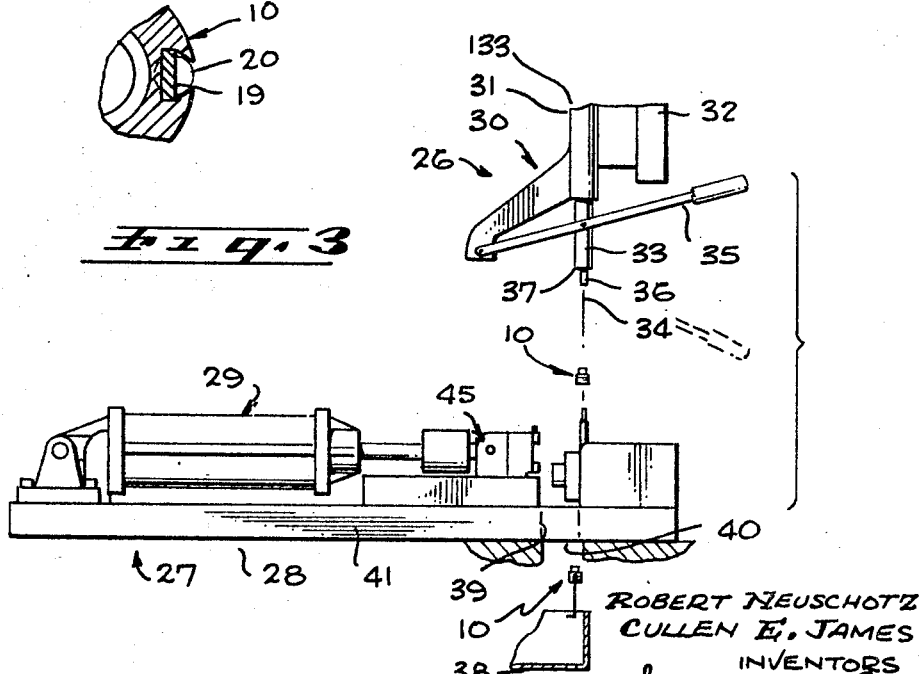
ROBERT NEUSCHOTZ
CULLEN E. JAMES
INVENTORS
BY William P. Green
ATTORNEY

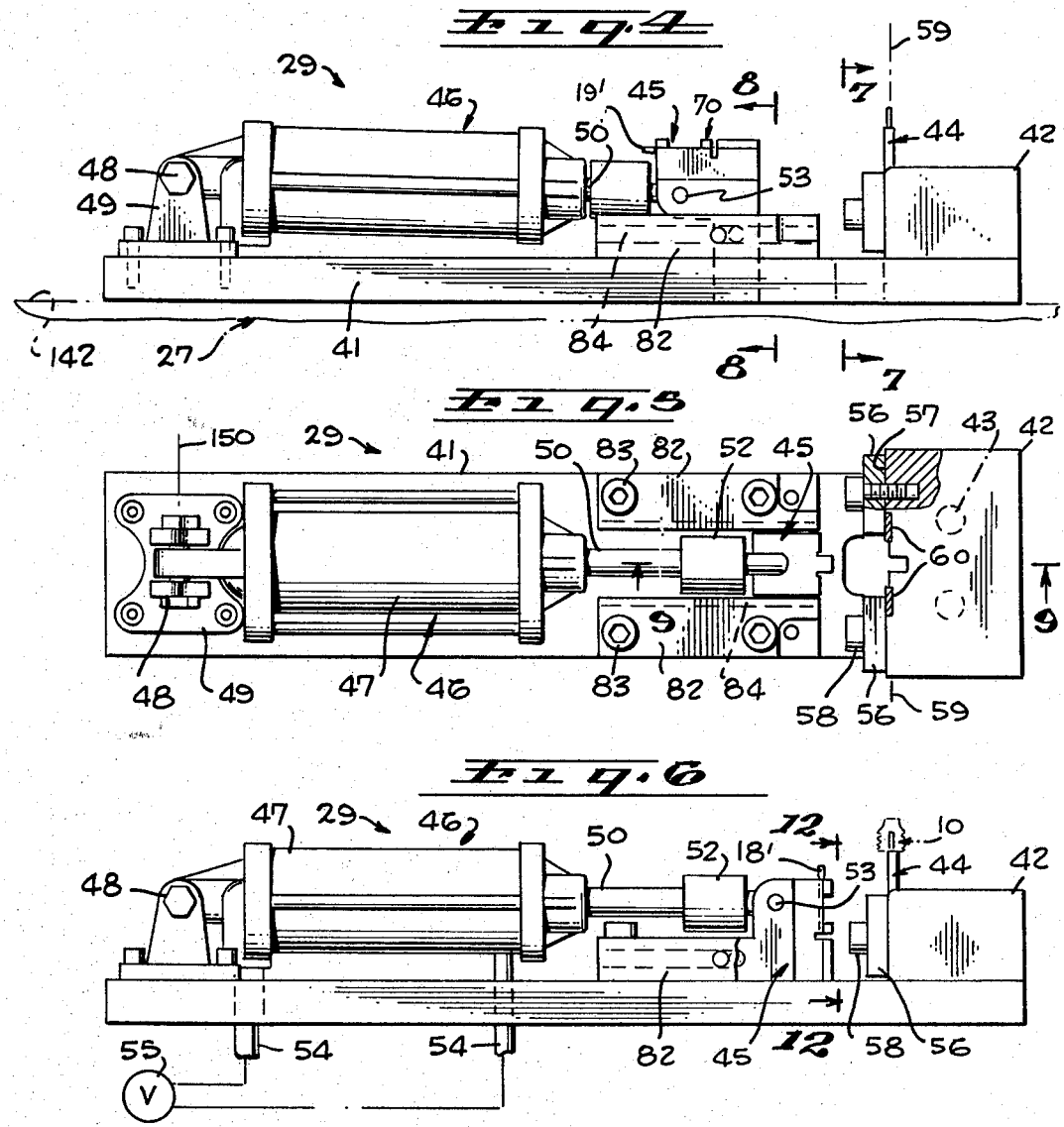

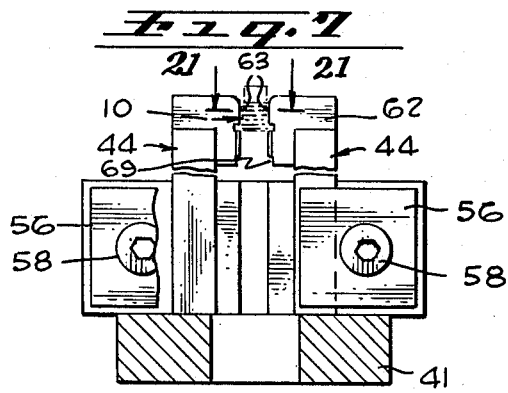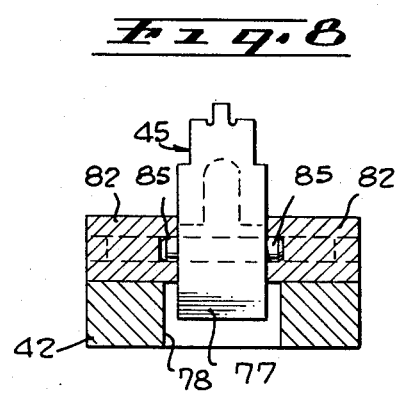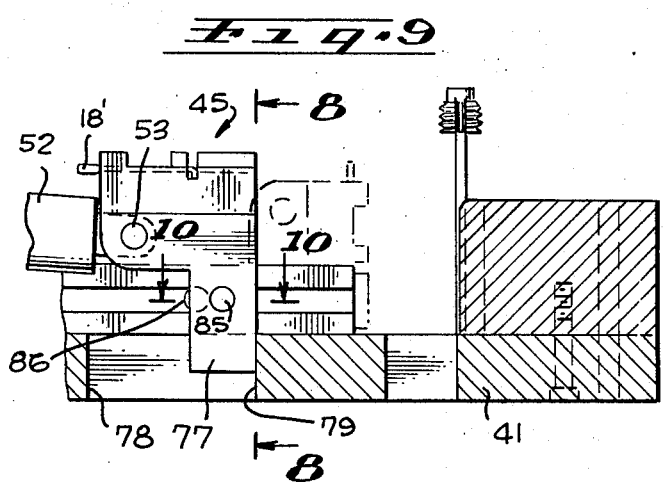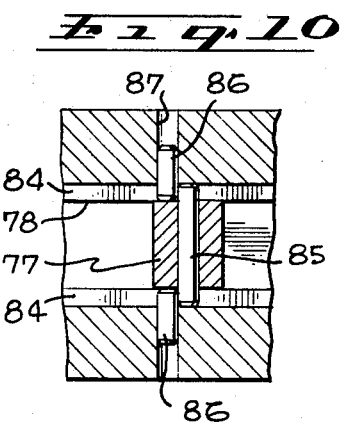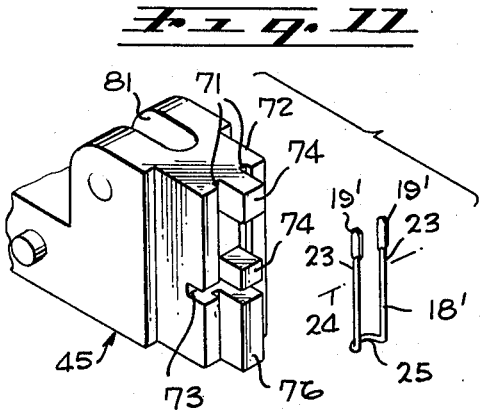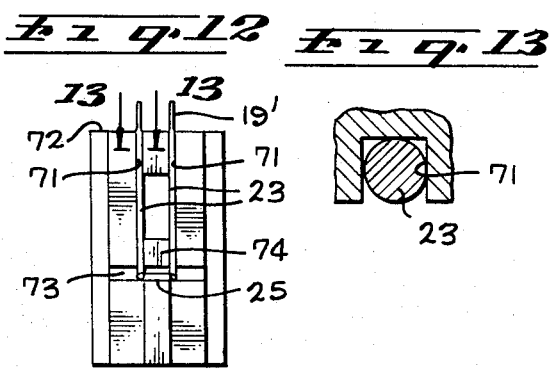

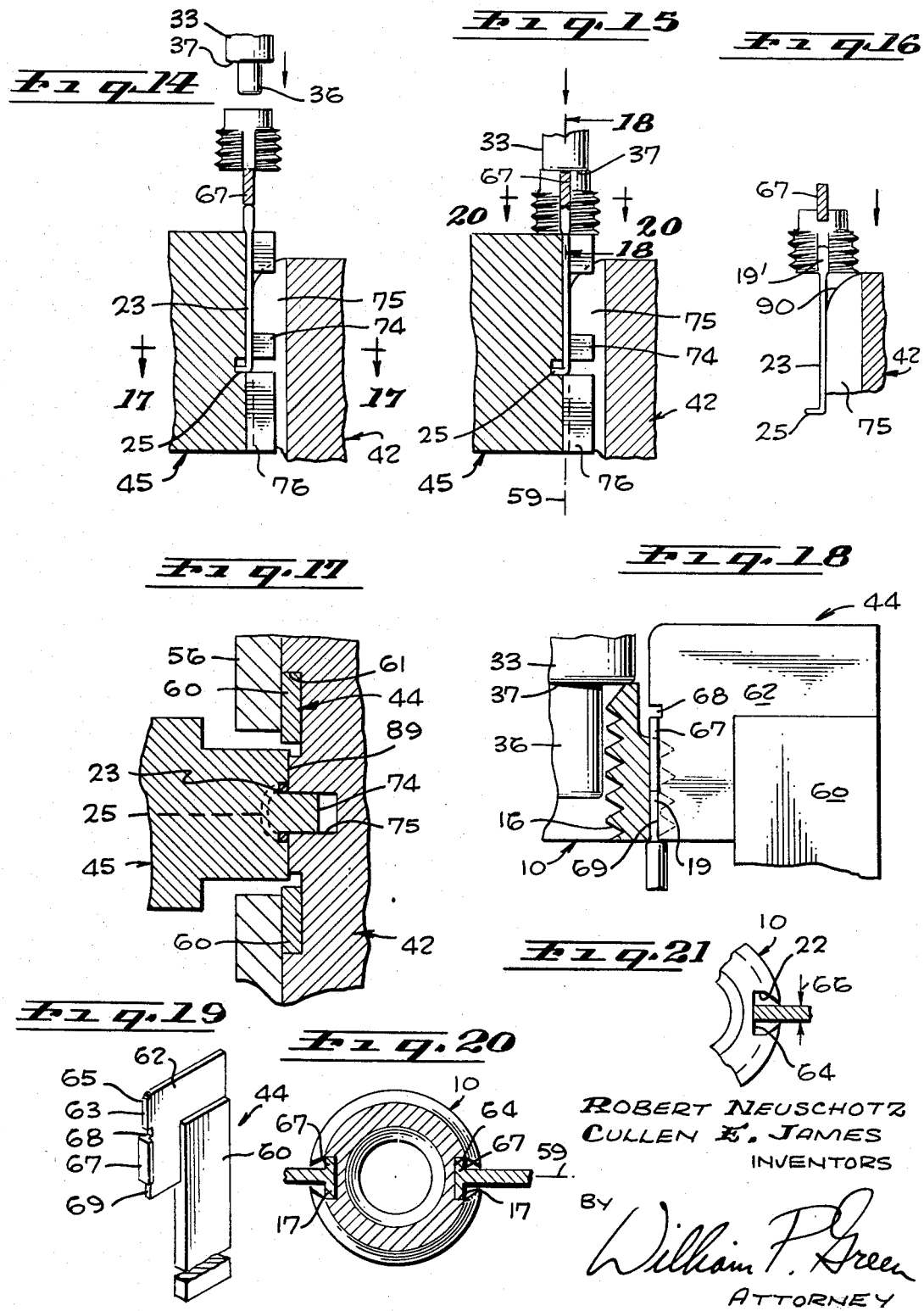

United States Patent Office 3,394,448
Patented July 30, 1968

3,394,448
INSTALLATION OF LOCKING KEYS FOR THREADED PARTS
Robert Neuschotz, Beverly Hills, and Cullen E. James, Southgate, Calif.; said James assignor to Newton Insert Co., Los Angeles, Calif., a corporation of California
Filed Oct. 23, 1965, Ser. No. 502,956
21 Claims. (Cl. 29—200)

ABSTRACT OF THE DISCLOSURE

A tool for installing a U-shaped locking key part within external grooves formed in an externally threaded fastener, and including a gripping structure for holding the U-shaped key part in a predetermined position in which its two arm are in alignment with two guides which are received within the grooves in the fastener, together with means for then forcing the fastener axially relative to the guides and the key part so that the arms of the key part are forced into the grooves. The cross piece of the U-shaped key part is then cut off so that the two arms form two separate keys in the grooves respectively.

---

This invention relates to improved apparatus for connecting a locking key into a threaded element, such as for example an internally and externally threaded insert. The locking keys with which the invention is concerned are of a type adapted to be received within grooves formed in the associated threaded elements, and to be ultimately driven along and within those grooves in a relation locking the element in a carrier part. Keys of this general type have been shown in copending application Ser. No. 488,931, filed Sept. 21, 1965, entitled "Formation of Threaded Elements and Locking Keys Therefore," inventor Robert Neuschotz, now Patent No. 3,346,031, issued Oct. 10, 1967; and in U.S. Patent No. 2,855,970, issued Oct. 14, 1958, to Robert Neuschotz, on "Insert Having Frictionally Retained Key Which Upsets Threads of Base Member."

In quantity manufacture of elements having locking keys of the above discussed type, it is frequently difficult to properly direct the keys into their coacting grooves in the threaded elements without damaging either the key or the threaded element, and in a manner positively assuring the attainment of a desired precisely predetermined relationship between the key and threaded element. Problems have been encountered especially in the installation of keys within threaded elements of very small size, in which case the keys are necessarily very small in cross-section and easily deformed or damaged during handling or installation.

The general object of the present invention is to provide improved apparatus which is capable of installing keys within threaded elements of the discussed type in a completely reliable manner, and with the relative positioning of the key and threaded element being controlled so effectively that the key must necessarily move properly into the groove in the element, without any possibility of damaging the groove walls or the insert, or of deforming the key during installation, even though the key may be of a very small size and easily bent. At the same time, the installing process is also preferably designed to attain a reaming action with respect to the groove of the threaded element itself, in a manner removing any burrs from the groove in advance of the key, so that such burrs can not interfere with installation of the key or the achievement of a proper locking action when the element is ultimately locked in a carrier part. Further, a mechanism constructed in accordance with the invention acts to achieve these installation and reaming results very rapidly, in a manner consistent with mass production of the items.

Apparatus embodying the invention includes means for holding the threaded element and key in a properly aligned relationship, and then relatively moving these parts to advance the key into the groove. Desirably, the key is held during installation between two clamping elements, which are relatively movable between initial retracted positions for reception of a key part, and active positions in which the key is clamped in alignment with the groove of the threaded element. The threaded element may be located in the apparatus by reception of a guiding part within one or more of the grooves of the element, to thereby locate the threaded element in the desired alignment with the key.

A particular feature of the invention resides in a unique structure which enables the last mentioned guiding part and the key to be located in a predetermined accurately controlled alignment, with relative motion between these parts and the threaded element then being induced in a relation causing the guiding part and key to advance progressively into the groove of the threaded element, so that the guiding part passes into and preferably entirely through the groove, and is followed by the accurately aligned but trailing key. In this way, the guiding part acts to properly align the key with the groove without any possibility of incorrect installation of the latter. It is contemplated that the relative motion between the threaded element and the guiding part and key could in some instances be produced by an arrangement in which the threaded element might be maintained stationary, while the other two parts were moved; however, in accordance with the preferred embodiment of the invention specifically disclosed in the accompanying drawings, it is felt more desirable that the apparatus be constructed to hold the guiding part and key stationary while the threaded element is itself displaced axially relative to these parts. It will also be understood that the invention could be applied to mechanism in which all of the parts might be movable, so long as the desired relative motion is attained.

A further feature of the invention has to do with the application of its principles to the simultaneous installation of two keys within two of the mentioned grooves in a threaded element, with these keys desirably being formed initially as a single part, and being installed while integrally interconnected, but being cut apart to form two separate keys after the installation procedure. The key part thus installed may be a U-shaped element, whose two parallel arms ultimately form the two keys. It is found that such an integral double key element is easier to handle during manufacture, and is easier to control and align in the present apparatus than are a plurality of separate keys.

The above and other features and objects of the invention will be better understood from the following detailed description of the typical embodiment illustrated in the accompanying drawings, in which:

FIG. 1 is a side view of a threaded element having locking keys to be installed by the present apparatus;

FIG. 1a is taken on line 1a—1a of FIG. 1;

FIG. 2 is an enlarged fragmentary perspective view showing one of the two diametrically opposite keys of the FIG. 1 insert;

FIG. 3 is a side view representation of a key installing machine embodying the invention;

FIG. 4 shows the apparatus of FIG. 3 in enlarged form and in an initial setting thereof, as it appears prior to the placement of a U-shaped key part onto the apparatus;

FIG. 5 is a plan view of the apparatus in FIG. 4, but shown in a second position, as the key is being shifted into the installation location;

FIG. 6 is a side view similar to FIG. 4, but with the apparatus shown in the FIG. 5 setting;

FIG. 7 is an enlarged view taken on line 7—7 of FIG. 4;

FIG. 8 is taken on line 8—8 of FIG. 4;

FIG. 9 is an enlarged fragmentary vertical section taken on line 9—9 of FIG. 5;

FIG. 10 is a horizontal fragmentary section taken on line 10—10 of FIG. 9;

FIG. 11 is a fragmentary perspective view of the shiftable key holding block, and showing in perspective a U-shaped key part of the type installed by the apparatus;

FIG. 12 is an enlarged vertical section taken on line 12—12 of FIG. 6;

FIG. 13 is a greatly enlarged fragmentary horizontal section taken on line 13—13 of FIG. 12;

FIG. 14 is a greatly enlarged fragmentary vertical section showing the parts in a position beyond that of FIG. 6, and in which the key part is rigidly clamped in the installation setting;

FIG. 15 shows the apparatus of FIG. 14, after the insert has been driven downwardly relative to the key part to install the latter within the insert grooves;

FIG. 16 shows the insert and key part after the shiftable key holding block has been retracted;

FIG. 17 is a fragmentary horizontal section taken on line 17—17 of FIG. 14;

FIG. 18 is an enlarged fragmentary vertical section taken on line 18—18 of FIG. 15, to show the relationship between certain of the parts, but with no attempt to illustrate the key clamping parts;

FIG. 19 is a fragmentary representation of one of the guide elements for holding and guiding the threaded insert;

FIG. 20 is taken on line 20—20 of FIG. 15; and

FIG. 21 is taken on line 21—21 of FIG. 7.

Referring first to FIG. 1, there is shown at 10 a threaded insert of the type adapted to be assembled by the apparatus of the present invention. This insert includes an essentially tubular body 11 centered about an axis 12, and having external threads 13 adapted to be screwed into mating internal threads 14 in a carrier part 15. The insert body 11 also has a set of internal threads 16 into which a coacting screw may be connected, to secure the screw to carrier part 15 through the medium of the insert. Body 11 has two grooves 17 formed in its outer surface, and extending axially through, and interrupting, external threads 13, at two diametrically opposite locations. Within grooves 17, body 11 carries two keys 18, each having a radially thin portion 19 received within the associated groove 17, and a radially thicker portion 20 which initially projects axially outwardly as shown in FIG. 1. When the insert is screwed into carrier part 15, shoulders 21 formed at the axially inner extremities of the second portions 20 of keys 18 engage the carrier part to limit the extent to which the insert is screwed into the carrier part, following which the keys are driven axially inwardly (downwardly in FIG. 1) so that shoulder 21 and the rest of the thickened portion 20 of each key cut into and deform the material of the carrier part, to effectively lock the insert against unscrewing rotation therefrom.

As will be understood best from FIG. 2, each of the keys may be formed of an externally cylindrical wire, which is flattened to form the radially thinned portion 19 of the key, and which retains its initial cylindrical shape at the location of the thicker locking portion 20 of the key. The flattening of portion 19 of the key also has the effect of widening it, transversely of the groove, to form two essentially parallel opposite side edges spaced apart a distance which is greater than the initial diameter of the wire, and which is very slightly greater than the width dimension 22 of the radially innermost portions of the grooves, so that portion 19 of the keys is a tight frictional fit within the grooves, to frictionally retain the keys in the illustrated positions until they are forceably driven by a hammer or otherwise axially inwardly to positions in which their portions 20 are received within the grooves.

As seen in FIG. 1a, the grooves 17 are preferably of dovetail cross section, to effectively retain the thin portions of the keys against radially outward separation from the grooves.

To facilitate handling of the keys, and their installation within an insert, the two keys to be installed within a particular insert body are initially formed as parts of a single wire, having the U-shaped configuration illustrated at 18' in FIG. 11. The two arms 23 of this U-shaped key part 18' are parallel to one another, and form the two keys respectively for a particular one of the inserts, with the thinned portions 19' of the two keys being formed at the ends of the two arms, and lying in two parallel planes. The keys are ultimately cut off in a plane designated 24 in FIG. 11. The cross-piece 25 of the generally U-shaped key part 18' of FIG. 11 may typically be curved as shown, to an essentially semi-circular shape, lying within a plane disposed transversely of the lengths of the two arms of part 18'; or may alternatively be a straight line cross piece within that plane and extending directly between the two arms.

The apparatus for connecting key parts 18' to insert body 11 is represented generally at 26 in FIG. 3, and is mounted on and supported by an appropriate bench or frame structure represented at 27. This bench has a horizontal rigid portion 28 to which a main key and insert holding section 29 of the apparatus is rigidly mounted, and above which there is supported an insert advancing or shifting section 30 of the apparatus, whose main body 31 is rigidly mounted to a support 32 which may project upwardly from and be fixed relative to the bench or frame 27. Apparatus 30 includes a plunger 33, which is appropriately mounted within a tubular guide 133 for vertical movement along an axis 34, and is actuated vertically by swinging manually actuated lever 35, and which has a reduced diameter portion 36 at its lower end adapted to project into one of the insert bodies 11. At the upper end of this reduced diameter portion 36, the desirably externally cylindrical element 33 forms a transverse annular shoulder 37 (FIG. 18) which is adapted to drive an associated one of the insert bodies 11 downwardly as element 33 moves downwardly.

Beneath the horizontal table-top portion 28 of bench 27, there is located a receptacle 38, into which the assembled insert and key part combinations fall from the apparatus, with openings 39 and 40 being formed in a bottom mounting plate 41 of apparatus 29 and in bench 27 to pass the assembled units.

Referring now to FIG. 4, base plate 41 may be an essentially rectangular elongated horizontally extending metal plate, which is rigidly secured by appropriate bolts or otherwise (not shown) to the upper horizontal surface 142 of bench 27. This base plate 41 carries at one of its ends a stationary block 42, secured by bolts 43 (FIG. 5) to the base plate. Block 42, in turn, rigidly and stationarily carries two upstanding guide elements or blades 44, for supporting and guiding the insert body during a key applying operation.

At a location opposite stationary block 42, the base plate 41 movably carries a shiftable block 45, which is adapted to receive the key part 18' of FIG. 11, and to shift that key part against and into clamped relation with respect to stationary block 42. Block 45 is shifted between its different positions by a conventional fluid actuated and desirably pneumatic piston and cylinder mechanism 46, whose cylinder 47 is pivotally connected at 48 to a mounting bracket 49, for relative pivotal movement about a horizontal axis 150 (FIG. 5). The piston within cylinder 47 carries a piston rod 50, which is actuable rightwardly and leftwardly by the piston along the axis 51 of the piston and cylinder mechanism, and which carries at its end an appropriate fitting represented at 52, which is pivotally connected by a pin 53 to the shiftable block 45, to move the latter rightwardly and leftwardly. Actuating air pressure is fed to the cylinder through lines typically represented at 54 (FIG. 6), under the control of an appropriate conventional three-way valve 55, which can admit air to either end of the cylinder to move the piston in either direction.

The previously mentioned insert guiding elements 44 may be rigidly secured to stationary block 42 by a pair of clamping plates 56, which are secured to the face 57 of block 42 by bolts 58, extending through plates 56 and into block 42. Elements 44 may be considered as taking the form essentially of vertically extending relatively thin blades, one of which is illustrated in perspective in FIG. 19, and which lie in a common vertical plane designated 59 in FIGS. 4, 5 and 15. Each of these blades has a first portion 60 which is received and confined within one of two similar aligned vertically extending grooves or recesses 61 formed in face 57 of block 42 (FIG. 17), and is tightly clamped within that recess 61 by one of the clamping plates 56.

At its upper end, each of the guiding elements 44 has a reduced thickness portion 62, still lying essentially within vertical plane 59 of FIGS. 4, 5 and 15. As will be understood best from FIGS. 7 and 18, portions 62 of guiding elements 44 extend toward one another within plane 59, and have vertically extending generally parallel opposed inner edges 63 (FIG. 7), which are spaced apart a distance somewhat less than the maximum external diameter of the insert body, to project into grooves 17 of the insert (FIGS. 20 and 21) in a relation guiding the insert for vertical movement between the two guide plates 44. Near their upper ends, the two vertical edges 63 have first portions 65 which engage the inner wall surfaces 64 of the grooves in the relation illustrated in FIG. 21. At and adjacent these portions 65 of edges 63, portions 62 of elements 44 may be of a thickness 66 (FIG. 21) corresponding substantially to the minimum width of the grooves, so that reception of these edge portions 65 within the two diametrically opposite grooves of an insert accurately locates that body and guides it for only directly vertical movement relative to the plates.

Beneath their portions 65, the vertical edges 63 of the plates have second portions 67, which are widened as shown in FIG. 20 to substantially the same cross-section as that of the thin portions 19 of keys 18, to thereby be confined very closely within the innermost portions of the grooves. The width of the two vertically extending parallel portions 67 of guides 44 corresponds substantially to the width of the radially innermost portions of the grooves, so that portions 67 of the blades can ream from the grooves any burrs formed therein during their manufacture.

Vertically between portions 65 and 67 of the blade edges, these edges may be cut away slightly at 68 (FIG. 7). Also, beneath portions 67 of the blades, these blades may be cut away at 69 (FIGS. 7, 18 and 19) to a thickness or radial depth corresponding to the radial thickness of portion 19 of one of the keys. During installation of a key part on one of the insert bodies 11, the portion 19' of a double key part 18' as seen in FIG. 11 is positioned and tightly clamped directly beneath the portion 67 of one of the blades, in direct vertical alignment therewith, as seen in FIG. 18.

The shiftable key holding block 45, when in the retracted position of FIG. 4, is adapted to have placed on its upper surface by an operator one of the U-shaped double key parts 18'. For receiving this key part, the surface 70 of block 45, which surface faces upwardly in FIG. 4 and horizontally toward block 42 in FIG. 5, has the shape illustrated in FIG. 11, to form two parallel grooves 71 within which the two elongated parallel arms 23 of key part 18' are received. As seen in FIG. 12, the key part is located in these grooves in a position in which the reduced thickness portions 19' of the two arms 23 project beyond planar end surface 72 of the block. Curved cross piece 25 of the U-shaped key part 18' projects into a notch or slot 73 formed in the block (see FIGS. 11, 12, 14 and 17), to locate the key part longitudinally in the block. Between the two grooves 71, block 45 may have one or more outwardly extending projections 74, having the rectangular cross section illustrated in FIG. 17, and adapted to be received within a vertically extending recess 75 in block 42 in the key clamping position of block 45. Downwardly beyond the slot 73 of FIG. 11, block 45 may have one or more additional projections 76 corresponding in cross section to the projections 74 and similarly receivable within the rectangular cross section vertical groove 75 of block 42.

Block 45 is so mounted as to automatically shift the key part from a horizontally extending retracted position to a vertically extending active position when the block is displaced rightwardly by piston and cylinder mechanism 46. For this purpose, block 45 has a rectangular projection 77 (FIGS. 8 and 9), which extends downwardly into a rectangular slot or opening 78 formed in base plate 41, so that when the piston and cylinder mechanism exerts rightward force against block 45, projection 77 engages vertical shoulders 79 formed at the end of opening 78, in a relation causing block 45 to swing through 90 degrees from the full line position of FIG. 9 to the broken line position of that figure. Further rightward movement of the piston shifts block 45 to the right in this new orientation. The previously mentioned pivot pin 53 interconnects piston rod fitting 52 and block 45 in a manner allowing this 90 degree swinging movement of block 45, since the end portion 80 of the fitting 52 is received within a vertical slot 81 in block 45, which slot will accommodate projection 80 during the entire swinging movement of the block 45.

Block 45 is retained and guided for its horizontal sliding movement by two parallel horizontally extending stationary guide rails 82 (FIGS. 4, 5 and 8), which are rigidly mounted to base blate 41 by screws or bolts 83, and which contain opposed parallel guide slots 84 extending horizontally and from left to right in FIGS. 4 and 5. For reception within grooves 84, block 45 rigidly carries a horizontally extending externally cylindrical pin 85, whose opposite ends are slidably received within grooves 84 and have a diameter corresponding substantially to the vertical dimension of grooves 84, so that pin 85 can move only horizontally relative to the guide rails 82. The leftward movement of pin 85 is limited in the position illustrated in FIGS. 4, 9 and 10, in which the opposite ends of pin 85 engage two coacting stationary stop pins 86 which are rigidly located within passages 87 in the guide rails 82, and which project into passages 84, as seen in FIG. 10, to stop the leftward movement of pin 85, and require block 45 to swing from its broken line position to its full line position of FIG. 9 upon further leftward movement of the piston.

To now describe a cycle of operation of the discussed apparatus, assume first of all that the apparatus is in the FIG. 4 condition, in which the key receiving grooves 71 of block 45 extend horizontally and face upwardly. With the appaartus in this condition, one of the U-shaped key parts 18' as shown in FIG. 11 is placed on the upper surface of block 45, in horizontally extending position, and with the ends of the keys projecting leftwardly as shown. At this same time, an operator may place an insert body 11 on the upper ends of plates 44, in the position illustrated in broken lines in FIG. 7, and in full lines in FIG. 9. In this position, upper edge portions 65 of blades 44 are received within two diametrically opposite grooves in the insert body, and the insert is supported on the upper ends of widened edge portions 67 of the blades, which as stated previously are close fits within the grooves, so that the insert will not normally move downwardly onto these portions unless forced thereonto. The initial positioning of the insert on the blades may be facilitated by rounding of the upper ends of the blades at 88.

With the key and insert thus placed on the apparatus in the positions illustrated in FIG. 9, the operator actuates control valve 55 of piston and cylinder mechanism 46 to move piston rod 50 rightwardly, through the intermediate position of FIGS. 5 and 6, and to the fully closed position of FIGS. 14 and 17. This rightward motion causes block 45 and the carried key part 18' to swing through 90 degrees to the broken line position of FIG. 9, by the action previously discussed, so that the key part is then in directly vertically extending position, following which further rightward movement of block 45 brings the key part into clamping engagement with vertical planar surfaces 89 of block 42 (FIG. 17), so that arms 23 of the key part are tightly clamped between blocks 42 and 45 along a substantial portion of their vertical extent. In this clamped position of the key part, the upper thinned end portions 19' of the two arms of the key part are very positively and rigidly held in accurately vertically aligned relation with, and directly beneath, guide edges 67 of blades 44, as illustrated in FIG. 18.

After the key part has reached this position of FIGS. 14 and 17, the operator actuates handle 35 of the insert advancing mechanism of FIG. 3, to move the element or mandrel 33 downwardly to and beyond the position of FIG. 18. Element 33 is so located as to always be aligned vertically with the insert held by blades 44, so that portion 36 of this element or mandrel 33 advances into the insert, and shoulder 37 then engages the insert, and forces it downwardly from the FIG. 7 broken line position to the position of FIG. 18. This downward motion forces the insert body downwardly relative to both the blades and the key part, so that the broaching portions 67 of the blades first advance into and through the grooves, and are followed by the thin portions 19' of key part 18', until those thin portions reach the fully installed positions of FIG. 18. Guide edges 67 of the blades thus positively and accurately guide the keys into the grooves, and also act to broach out the grooves in advance of the keys.

After the mandrel 33 has reached the FIG. 18 setting, and while the mandrel is retained in that position, the operator actuates control valve 55 to cause piston and cylinder mechanism 46 to retract block 45 leftwardly away from block 42 through the intermediate position of FIGS. 5 and 6, and to the retracted upwardly facing position of FIG. 4, in preparation for reception of the next successive key part on block 45. The final portion of this leftward motion of block 45 causes this block, under direction of interengaging pins 85 and 86, to swing through 90 degrees from the broken line position of FIG. 9 to the full line position of that figure.

After block 45 has moved away from its FIG. 14 position of clamping engagement with block 42, the operator actuates mandrel 33 downwardly farther, from the position of FIGS. 15 and 18, to the position of FIG. 16, in which the insert is far enough down that no portion of the blades 44 is received within the two grooves of the insert, so that the insert and its attached key part 18' may then fall downwardly by gravity, be deflected slightly laterally by upper rounded corners 90 formed on block 42 at the upper end of its groove or recess 75, and then fall downwardly through apertures 39 and 40 into receptacle 38 of FIG. 3. The two arms of key part 18' may subsequently be cut off, in another piece of apparatus, in the plane represented at 24 in FIG. 11, so that the initially U-shaped key part 18' may form the two diametrically opposite keys in the insert.

We claim:

1. Apparatus for attaching a key part to a threaded element having a groove for slidably receiving the key part, comprising two relatively movably holding parts operable to retain said key part therebetween, means for actuating said holding parts relative to one another between an active position in which the key part is positively held and a retracted position in which the key part may be fed to and removed from the holding parts, and means for producing relative motion between said threaded element and said holding parts and a retained key part in a relation relatively advancing said key part into said groove of the threaded element.

2. Apparatus as recited in claim 1, in which said actuating means include means for shifting one of said holding parts away from the outer and then swinging said one part about essentially an axis to a position in which said key part may be applied thereto.

3. Apparatus as recited in claim 1, including guide means fixed relative to one of said holding parts and constructed to project into said groove in a relation guiding said element for predetermined axial movement, said means for producing relative motion including a member adapted to engage said element and shift it essentially axially to connect it to said key part.

4. Apparatus as recited in claim 1, in which said actuating means include power actuated means for shifting one of said holding parts essentially horizontally toward and away from the other part to clamp and release said key part, said one holding part having a face shaped to receive and carry said key part and which faces generally horizontally toward said other holding part in said active position, said actuating means including means for swinging said one holding part to a position in which said face is directed upwardly to receive a key part as said one holding part moves to said retracted position, there being a pair of guides fixed relative to said other holding part and extending generally vertically and adapted to receive therebetween said element with said guides received slidably in said groove in the element and in a second groove formed therein in a relation guiding the element for movement downwardly into connection with said key part, said means for producing relative motion including a member movable downwardly against said element to force it downwardly relative to the guides and key part.

5. Apparatus for attaching a key part to a threaded element having a groove for slidably receiving the key part, comprising a shiftable key holding part, means for shifting said holding part between a retracted position for receiving a key part and an active position, means for connecting said key part to said element when the holding part is in said active position, said shifting means including power operated means for moving said holding part toward and away from said active position, and including means for swinging said holding part about essentially an axis upon said movement toward and away from the active position to expose said holding part in said retracted position for reception of the key part.

6. Apparatus as recited in claim 5, in which said means for swinging the holding part include a support having an upwardly facing surface on which said holding part is shiftable between said positions, said holding part having a lug projecting downwardly into a recess in said support and engageable with an edge of the recess in a relation swinging the holding part pivotally upon shifting movement of the holding part.

7. Apparatus as recited in claim 6, including a shoulder carried by said key holding part slidably received in a guideway carried by the support, and a shoulder engageable by said first mentioned shoulder upon retracting movement of the key holding part toward said retracted position and operable to halt bodily retracting movement of the key holding part and commence its pivotal movement swinging said lug into said recess.

8. Apparatus for attaching a key part with two arms to a threaded element having two grooves for slidably receiving said arms, comprising two guides constructed to be slidably received in said grooves respectively in advance of said arms of the key part, means for holding said key part in a predetermined position in which said two arms thereof are in essential alignment with said guides longitudinally of the grooves, and means for producing relative movement longitudinally of said grooves between said threaded element and said guides and aligned key part in a relation advancing said two guides slidably relative to and within the two grooves respectively and also advancing said two arms of the key part slidably relative to and into said grooves behind the guides.

9. Apparatus as recited in claim 8, in which said guides have edges slidably received in said two grooves with first relatively narrow portions and second wider portions occupying substantially the entire width of said grooves.

10. Apparatus for attaching a key part to a threaded element having a groove for slidably receiving the key part, comprising a guide constructed to be slidably received in said groove in advance of said key part, means for holding said key part in a predetermined position of essential alignment with said guide longitudinally of the groove, and means for producing relative movement longitudinally of said groove between said threaded element and said guide and aligned key part in a relation advancing said guide slidably relative to and within the groove and also advancing said key part slidably relative to and into the groove behind the guide, said guide having an edge structure slidably received in said groove with a first relatively narrow portion and a second and trailing wider portion occupying substantially the entire width of said groove.

11. Apparatus for attaching a key part to a threaded element having a groove for slidably receiving the key part, comprising a guide constructed to be slidably received in said groove in advance of said key part, means for holding said key part in a predetermined position of essential alignment with said guide longitudinally of the groove, and means for producing relative movement longitudinally of said groove between said threaded element and said guide and aligned key part in a relation advancing said guide slidably relative to and within the groove and also advancing said key part slidably relative to and into the groove behind the guide, said holding means including two holding parts relatively movable between a first position in which said key part is gripped therebetween and a second position in which said key part can be fed to the holding parts.

12. Apparatus for attaching a key part to a threaded element having a groove for slidably receiving the key part, comprising a guide constructed to be slidably received in said groove in advance of said key part, means for holding said key part in a predetermined position of essential alignment with said guide longitudinally of the groove, and means for producing relative movement longitudinally of said groove between said threaded element and said guide and aligned key part in a relation advancing said guide slidably relative to and within the groove and also advancing said key part slidably relative to and into the groove behind the guide, said holding means including a first holding part, and a second holding part movable between a retracted position and a clamping position in which said key part is clamped between said holding parts, said second holding part having a face shaped to receive and locate the key part, there being means for retracting said second holding part away from said first part, and operable upon such retraction to swing said second part essentially pivotally to a position in which said face is accessible to receive said key part.

13. Apparatus for attaching a key part to a threaded element having a groove for slidably receiving the key part, comprising a guide constructed to be slidably received in said groove in advance of said key part, means for holding said key part in a predetermined position of essential alignment with said quide longitudinally of the groove, and means for producing relative movement longitudinally of said groove between said threaded element and said guide and aligned key part in a relation advancing said guide slidably relative to and within the groove and also advancing said key part slidably relative to and into the groove behind the guide, said means for producing movement including a shifting structure operable to engage said element and move it axially while said guide and key part remain stationary to connect the element to the key part.

14. Apparatus for attaching a key part to a threaded element having a groove for slidably receiving the key part, comprising a guide constructed to be slidably received in said groove in advance of said key part, means for holding said key part in a predetermined position of essential alignment with said guide longitudinally of the groove, and means for producing relative movement longitudinally of said groove between said threaded element and said guide and aligned key part in a relation advancing said guide slidably relative to and within the groove and also advancing said key part slidably relative to and into the groove behind the guide, said means for producing movement including an advancing structure operable to engage said element and displace it axially through a first range of movement to mount the key in the groove, and to subsequently displace the element through a second range of movement to release it from said guide, said holding means being operable to release said key part after said element has moved through said first range but before it has moved through said second range.

15. Apparatus for attaching an essentially U-shaped key part with two arms to a threaded element having two grooves for slidably receiving said arms, said grooves extending axially at opposite sides of said element, comprising two guides having spaced edges constructed to be slidably received in said grooves respectively in advance of said arms of the key part and guiding the element for axial movement, a first holding part fixed relative to said guides, a second holding part movable between an active position in which said key part is clamped between said two holding parts and a retracted position in which said key part may be fed to the holding parts, said second holding part having a face recessed to receive and hold and carry said key part and exposed for reception of the key part in said retracted position, means for actuating said second holding part between said active and retracted positions, said two holding parts being constructed in said active position of the second part to hold said two arms of the key part in essential alignment with the two guides respectively longitudinally of said grooves, and a structure movable axially of said element and operable to engage the latter and shift it axially relative to said guides and said arms in a relation simultaneously advancing both guides within the two grooves respectively and also relatively advancing said two arms of the key part into the grooves behind the guides, said last mentioned structure being subsequently movable farther, after retraction of said second holding part, to free the element from said guides.

16. Apparatus as recited in claim 15, in which said edges of the guides which are received in said grooves have first leading portions of relatively narrow thickness and second trailing portions of a greater thickness corresponding substantially to the width of said grooves and to predetermined portions of said arms of the key part.

17. Apparatus for attaching a locking key part to a fastener having external threads and having an external groove of undercut cross section for slidably receiving said key part, said groove extending generally axially along the outer surface of the fastener and through said external threads; said apparatus comprising a guide constructed and dimensioned to be slidably received in said external groove in advance of said key part, means for holding said key part and said guide in predetermined relative positions in which said key part is in essential alignment with the guide longitudinally of the groove, and means for producing relative movement longitudinally of said groove between said fastener and both said guide and the aligned key part in a relation advancing said guide slidably relative to and within the groove and also advancing said key part slidably relative to and into the groove behind the guide.

18. Apparatus for attaching a key part to an element having external threads and having an external groove for receiving the key part, said groove extending generally axially through said threads; said apparatus comprising means for holding said key part stationarily in a predetermined position of alignment with said external groove of the threaded element, and means for shifting said threaded element longitudinally of the groove while the key part remains stationary and in a relation forcing said element slidably onto the key so that the key is retained in the groove.

19. Apparatus for attaching a key part to an element having external threads and having at least one external groove for receiving the key part, said groove extending generally axially through said threads, said apparatus comprising a first structure for holding said element in a predetermined orientation to the first structure and guiding the element for predetermined generally axial movement, a second structure for holding said key part, means mounting said second structure for shifting movement between a retracted position for receiving said key part and an active position in which the key part is aligned with the threaded element for attachment thereto, and means for driving said threaded element essentially axially relative to the key part when said second structure is in said active position and in a manner driving the key part into said external groove.

20. Apparatus for attaching two locking keys to an element having external threads and having two external grooves at opposite sides for receiving said keys respectively; said apparatus comprising two spaced generally opposed axially extending guides receivable within said grooves respectively to locate said element therebetween and guide it for relative axial movement, means for holding said keys in predetermined positions of essential longitudinal alignment with said guides respectively, and means for producing relative movement longitudinally of said grooves between said element and said guides and keys in a relation advancing said guides slidably relative to and within the grooves and also advancing said keys slidably relative to and into the grooves behind the guides.

21. Apparatus as recited in claim 20, in which said two guides form essentially vertically extending spaced edges projectable horizontally into said grooves respectively in guiding relation, said holding means being located to position and hold the keys essentially beneath and aligned with said spaced edges.

References Cited
UNITED STATES PATENTS

| | | | |
|---|---|---|---|
| 2,465,534 | 3/1949 | Havener | 29—464 |
| 3,121,279 | 2/1964 | Van Hoof et al. | 29—418 |

THOMAS H. EAGER, *Primary Examiner.*